United States Patent
Shi et al.

(10) Patent No.: US 9,497,647 B2
(45) Date of Patent: Nov. 15, 2016

(54) METHODS AND DEVICES FOR REPORTING IN A CELLULAR RADIO NETWORK

(71) Applicant: TELEFONAKTIEBOLAGET L M ERICSSON (PUBL), Stockholm (SE)

(72) Inventors: Nianshan Shi, Jarfalla (SE); Mattias Akervik, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 136 days.

(21) Appl. No.: 14/237,829

(22) PCT Filed: Feb. 27, 2013

(86) PCT No.: PCT/SE2013/050179
§ 371 (c)(1),
(2) Date: Feb. 7, 2014

(87) PCT Pub. No.: WO2013/137802
PCT Pub. Date: Sep. 19, 2013

(65) Prior Publication Data
US 2014/0211652 A1 Jul. 31, 2014

Related U.S. Application Data

(60) Provisional application No. 61/610,785, filed on Mar. 14, 2012.

(51) Int. Cl.
*H04W 24/08* (2009.01)
*H04W 36/18* (2009.01)
(52) U.S. Cl.
CPC ............. *H04W 24/08* (2013.01); *H04W 36/18* (2013.01)

(58) Field of Classification Search
CPC .... H04W 24/08; H04W 24/10; H04W 36/18
USPC ......................................................... 370/252
See application file for complete search history.

(56) References Cited

U.S. PATENT DOCUMENTS 9,107,095 B2 *   8/2015   Racz et al.
2005/0239435 A1  10/2005  Ikeda et al.
(Continued)

FOREIGN PATENT DOCUMENTS

| CN | 101137196 A | 3/2008 |
| CN | 101453760 A | 6/2009 |

(Continued)

OTHER PUBLICATIONS

3rd Generation Partnership Project; Technical Specification Group Radio Access Network; UTRAN Iur interface Radio Network Subsystem Application Part (RNSAP) signalling (Release 11), 3GPP TS 25.423 V11.0.0, 2011, 1145 pages.

(Continued)

*Primary Examiner* — Chi H Pham
*Assistant Examiner* — Robert Lopata
(74) *Attorney, Agent, or Firm* — Rothwell, Figg, Ernst & Manbeck, P.C.

(57) ABSTRACT

Methods and devices are provided for signal interaction with a radio network controller and a radio base station where a report signal comprising information indicating downlink performance associated with a data queue in the radio base station is generated and transmitted to the radio network controller. Hereby scheduling in the radio network controller can take into account the downlink performance associated with a data queue.

21 Claims, 13 Drawing Sheets

(56) References Cited

U.S. PATENT DOCUMENTS

| | | | |
|---|---|---|---|
| 2006/0146749 | A1* | 7/2006 | Lundh et al. ............... 370/331 |
| 2007/0082675 | A1 | 4/2007 | Gruet et al. |
| 2008/0186862 | A1* | 8/2008 | Corbett et al. ............ 370/237 |
| 2010/0136998 | A1* | 6/2010 | Lott .................. H04W 16/14 455/453 |
| 2012/0046026 | A1* | 2/2012 | Chande et al. ............ 455/422.1 |
| 2012/0230264 | A1* | 9/2012 | Zhang ................. H04W 72/04 370/329 |
| 2012/0320814 | A1* | 12/2012 | Chen et al. ................ 370/312 |
| 2014/0056142 | A1* | 2/2014 | Racz et al. ................ 370/235 |

FOREIGN PATENT DOCUMENTS

| | | |
|---|---|---|
| CN | 102186246 A | 9/2011 |
| EP | 1 633 086 A2 | 3/2006 |
| EP | 2 120 405 A1 | 11/2009 |
| EP | 2 239 974 A2 | 10/2010 |
| WO | 03096553 A2 | 11/2003 |
| WO | 2006125472 A1 | 11/2006 |
| WO | 2007035796 A1 | 3/2007 |
| WO | 2008097168 A2 | 8/2008 |
| WO | 2008097179 A2 | 8/2008 |
| WO | 2011100492 A1 | 8/2011 |

OTHER PUBLICATIONS

3rd Generation Partnership Project; Technical Specification Group Radio Access Network; UTRAN Iub interface Node B Application Part (NBAP) signalling (Release 11), 3GPP TS 25.433 V11.0.0, 2011, 1285 pages.

3rd Generation Partnership Project; Technical Specification Group Radio Access Network; UTRAN Iub interface user plane protocols for Common Transport Channel data streams (Release 10), 3GPP TS 25.435 V10.4.0, 2011, 61 pages.

3rd Generation Partnership Project; Technical Specification Group Radio Access Network; UTRAN Iur interface user plane protocols for Common Transport Channel data streams (Release 10), 3GPP TS 25.425 V10.2.0, 2011, 49 pages.

3rd Generation Partnership Project; Technical Specification Group Radio Access Network; UTRAN Iub/Iur interface user plane protocols for DCH data streams (Release 11), 3GPP TS 25.427 V11.0.0, 2011, 48 pages.

* cited by examiner

```
7                                                    0
```

| Spare bits 7-6 | Congestion Status | CmCH-PI |
|---|---|---|
| Maximum MAC-d PDU Length ||| 
| Maximum MAC-d PDU Length (cont) || HS-DSCH Credits |
| HS-DSCH Credits (cont) |||
| HS-DSCH Interval |||
| HS-DSCH Repetition Period |||
| New IE Flags |||
| PQ Status Report |||
| PQ Status Report (cont) |||
| PQ Status Report (cont) |||
| PQ Status Report (cont) |||
| Spare Extension |||

Fig. 10

METHODS AND DEVICES FOR REPORTING IN A CELLULAR RADIO NETWORK

CROSS REFERENCE TO RELATED APPLICATION(S)

This application is a 35 U.S.C. §371 National Phase Entry Application from PCT/SE2013/050179, filed Feb. 27, 2013, designating the United States, and also claims the benefit of U.S. Provisional Application No. 61/610,785, filed Mar. 14, 2012. The disclosures of both applications are incorporated herein in their entirety by reference.

TECHNICAL FIELD

The present disclosure relates to methods and devices for reporting in a cellular radio network.

BACKGROUND

Cellular radio networks are constantly evolving. One feature introduced in Wideband Code Division Multiple Access (WCDMA) networks is High Speed Packet Access (HSPA) that is used to enhance data rates within the radio network. During High Speed (HS) serving cell change from one Node B (alternatively referred to as a Radio Base Station, RBS) to another Node B, the central control node also referred to as Radio Network controller (RNC) decides a time for the old Node B to stop sending data and for the new node B to start to send data. During so-called Multi Point Transmission (MP Transmission) High Speed Downlink Packet Access (HSDPA) operation, which is currently agreed in 3GPP to support in Release 11 (Rel-11), the RNC should split the data and send the data via two, or more, cells in one Node B (Intra Node B MP Transmission), or two cells in different Node Bs (Inter Node B MP Transmission).

There is a constant demand for improving existing systems and to provide more efficient transmission in a cellular radio system. Hence, there is a need for a method and an apparatus that provide an improved transmission in a cellular radio system.

SUMMARY

It is an object of the present invention to provide an improved method and apparatus for improving transmission in a radio network, in particular a multipoint transmission enabled cellular radio network.

This object and others are obtained by the method and apparatus as set out in the appended claims.

As has been realized by the inventors, in Inter Node B MP Transmission, there is no communication between two Node Bs. The two Node Bs may have different radio conditions so one has longer queue, or even congestion, while the other one does not. There is no indication from Node B to RNC about its data queue status. Without the knowledge of the Node Bs condition, RNC may split the data evenly. Data transmitted to a UE via the Node B suffering from bad radio conditions may be delayed causing retransmissions to be requested by the RNC which would further cause data being queued and worsen the problems.

Also, in the HS serving cell change between two Node Bs, the RNC sends the last patch of the data to the old Node B without knowing the data queue situation in the Node B.

To reduce these problems methods and devices are provided for signal interaction with a radio network controller and a radio base station where a report signal comprising information indicating downlink performance associated with a data queue in the radio base station is generated and transmitted to the radio network controller. Hereby scheduling in the radio network controller can take into account the downlink performance associated with a data queue in the Node B.

In accordance with some embodiments a method in a radio base station for signal interaction with a radio network controller is provided. The method comprises generating a report signal comprising information indicating downlink performance associated with a data queue in the radio base station; and transmitting the generated report signal to the radio network controller.

The triggering conditions can be received in a control signal from the radio network controller defining the set of monitored triggering conditions to be applied by the radio base station and the report signal can be generated and transmitted in response to the radio base station receiving a request signal from the radio network controller requesting the radio base station to report the downlink performance of said data queue in the radio base station.

The report signal can be periodically generated and transmitted. A periodic report signal can be generated in response to a control signal from the radio network controller requesting the report signal to be periodically generated and transmitted with a given periodicity.

The report signal can be a user plane data frame comprising said information indicating downlink performance of said data queue in the radio base station. Also the data queue can be used for buffering data belonging to a downlink data flow associated with a user equipment. In accordance with some embodiments, the data queue is a MAC-hs or MAC-ehs Priority Queue.

In accordance with some embodiments a method in a radio network controller for signal interaction with a radio base station is provided. The method comprises receiving a report signal from the radio base station, where the report signal comprises information indicating downlink performance associated with a data queue in the radio base station. In some embodiments, prior to receiving the report signal, a control signal is transmitted to the radio base station defining a set of monitored triggering conditions to be applied by the radio base station for reporting downlink performance associated with the data queue in the radio base station. In some embodiments, prior to receiving the report signal, the radio network controller sends a request signal to the radio base station requesting the radio base station to report the downlink performance associated with said data queue in the radio base station. In some embodiments, prior to receiving the report signal, the radio network controller sends a control signal to the radio base station requesting the report signal to be periodically generated and transmitted with a given periodicity.

The data queue can be used for buffering data belonging to a downlink data flow associated with a user equipment. Also data scheduling for transmission to the user equipment via the radio base station can be performed taking into account the reported downlink performance associated with the data queue.

The report signal as described above can be generated and transmitted/received in response to the radio base station detecting that a triggering condition included in a set of monitored triggering conditions is fulfilled. The set of monitored triggering conditions includes one or more of:

Node B Frame Number, BFN, or Connection Frame Number, CFN, having reached a predefined valued;

a parameter value included in a previously transmitted report signal has been assigned a new value;

a parameter value is above a first threshold;

a parameter value is below a second threshold;

one or several MAC-d protocol data units have been discarded;

the length of the data queue exceeds a third threshold value;

the length of the data queue is below a fourth threshold value.

Information in the report signal can comprise at least one of:

delay reference time deviation data;

data queue length, data queue drain rate, data queue drain rate trend,

Hybrid Automatic Repeat Request, HARQ, protocol statistics, an indication whether one or more protocol data units have been discarded, an indication of downlink connection quality trend.

The disclosure also extends to devices and in particular a radio base station Node B and a radio network controller RNC for use in a cellular radio system and which are adapted to perform the methods as described herein. The devices can be provided with a controller/controller circuitry for performing the above processes. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawings, in which:

FIGS. 9 and 10 illustrate exemplary implementations.

DETAILED DESCRIPTION

Figure 1:
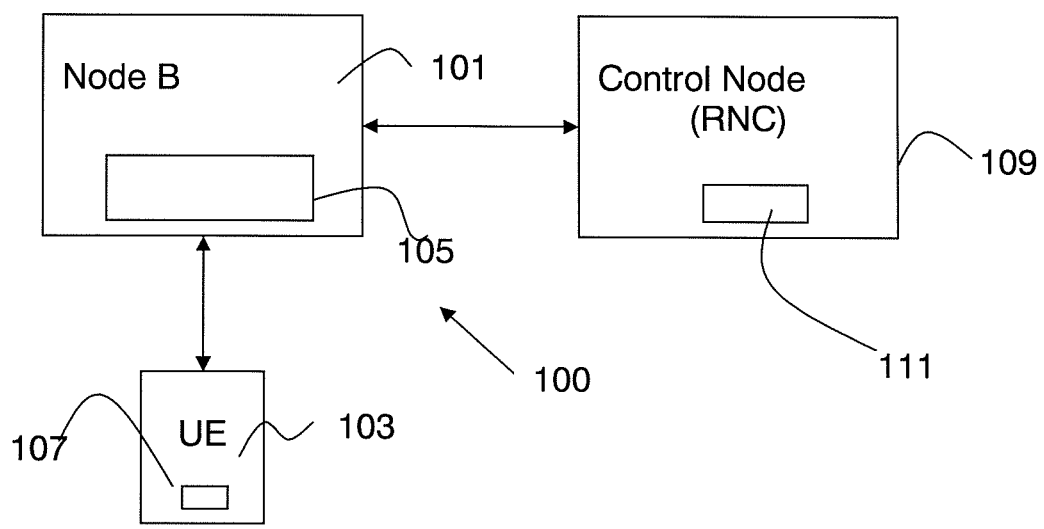
FIG. 1 depicts a general view of a cellular radio system.

In FIG. 1 a general view of a cellular radio system 100 is depicted. The system can for example be a WCDMA/HSPA system adapted for Multi Point Transmission of data. The system 100 comprises a number of radio base stations 101, here denoted NodeBs, whereof only one is shown in the simplified view in FIG. 1. The radio base stations 101 are connected to a control node denoted Radio Network controller (RNC) 109. The system 100 may of course comprise multiple RNCs. The RNC 109 further comprises a module 111 for performing different operations of the RNC 109. The module 111 can for example be implemented using a network interface circuit for signal interaction with a radio base station 101. In particular the network interface circuit can be adapted to receive a report signal from the radio base station 101. The report signal can for example comprise information indicating downlink performance associated with a data queue in the radio base station. The module 111 can further include digital data processing circuitry, operably connected to the network interface circuit. The digital data processing circuitry can be adapted to define a set of monitored triggering conditions to be applied by the radio base station for reporting downlink performance associated with the data queue in the radio base station and further adapted to cause the network interface circuit to transmit a control signal to the radio base station indicating a defined set of monitored triggering conditions. The digital data processing circuitry can further be operably connected to the network interface circuit, and adapted to cause the network interface circuit to transmit a request signal to the radio base station requesting the radio base station to report the downlink performance associated with a data queue in the radio base station.

Mobile stations 103, here represented by a single unit and denoted User Equipment (UE), that are present in a geographical area covered by the radio base station can connect to the radio base station over a radio interface. The radio base station 101 further comprises a module 105 for performing different operations of the radio base station 101. The module 105 can for example be implemented using a microcontroller operating on a set of computer software instructions stored on a memory in the module 105. In particular the module 105 can comprises a memory for holding data e.g. data of one or more data queues; and a digital data processing circuitry adapted to process data including generating a report signal comprising information indicating downlink performance associated with a first data queue among said one or more data queues; and also a network interface circuit, operably connected to the digital data processing circuitry, and adapted to transmit the generated report signal to the radio network controller 109. The UEs 103 in turn comprises a module 107 adapted to perform operations of the UEs 103. The module 107 can for example be implemented using a microcontroller operating on a set of computer software instructions stored on a memory in the module 107. The NodeB supports transmission to and from all the UEs in the area that it covers.

Figure 12:
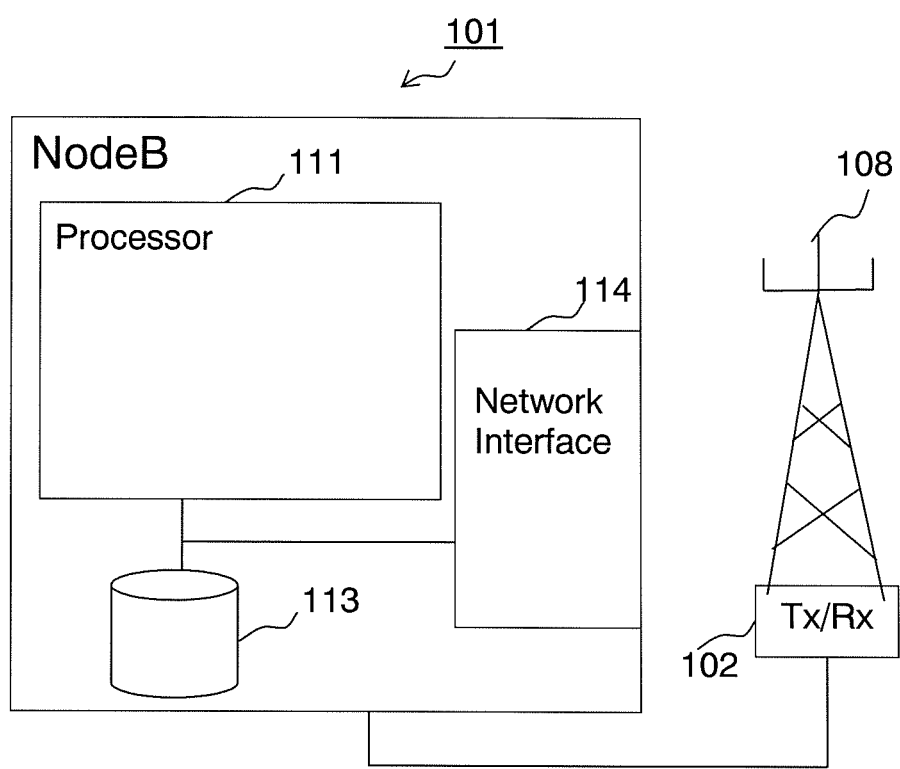
FIG. 12 illustrates a NodeB.

In FIG. 12 an exemplary radio base station 101 is shown. As shown in FIG. 12, the example radio base station 101 includes a processor 111, a memory 113, at transceiver 102, and an antenna 108. The example radio base station can also comprise a network interface 114 for communication with other nodes, in particular a control node such as an RNC 109. In particular embodiments, some or all of the functionality described herein as being provided by a radio base station, may be provided by the radio base station processor executing instructions stored on a computer-readable medium, such as the memory 113 shown in FIG. 12. Alternative embodiments of the base station may include additional components responsible for providing additional functionality, including any of the functionality identified above and/or any functionality necessary to support the solution described above.

Figure 13:
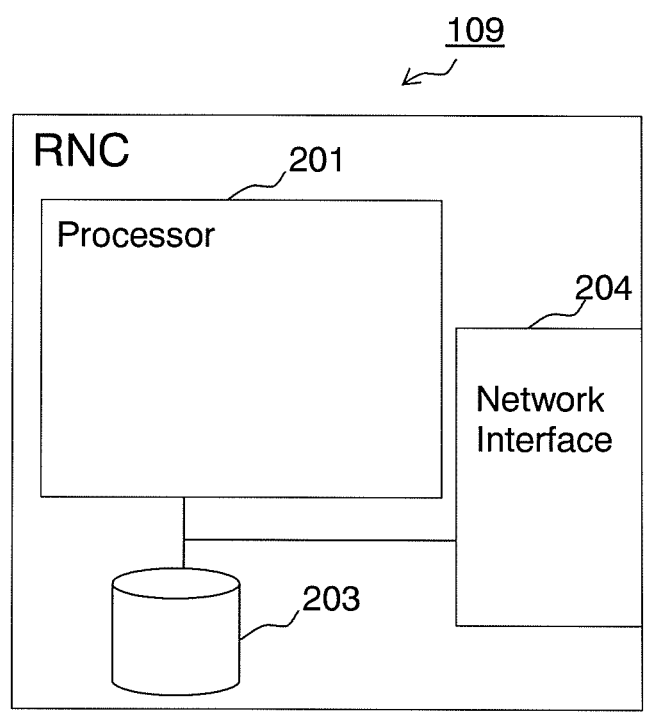
FIG. 13 illustrates a Radio Network Controller.

Further, FIG. 13 depicts an exemplary control node 109, such as an RNC. The example control node/RNC 109 includes a processor 201, a memory 203, and a network interface 204 for connection to other nodes of a cellular network such as a radio base station 101. In particular embodiments, some or all of the functionality described herein as being provided by a control node/RNC, may be provided by the processor 201 executing instructions stored on a computer-readable medium, such as the memory 203.

Data queues in a radio base station/Node B may include Medium Access Control (MAC) MAC-hs and/or MAC-ehs Priority Queues.

Figure 2:
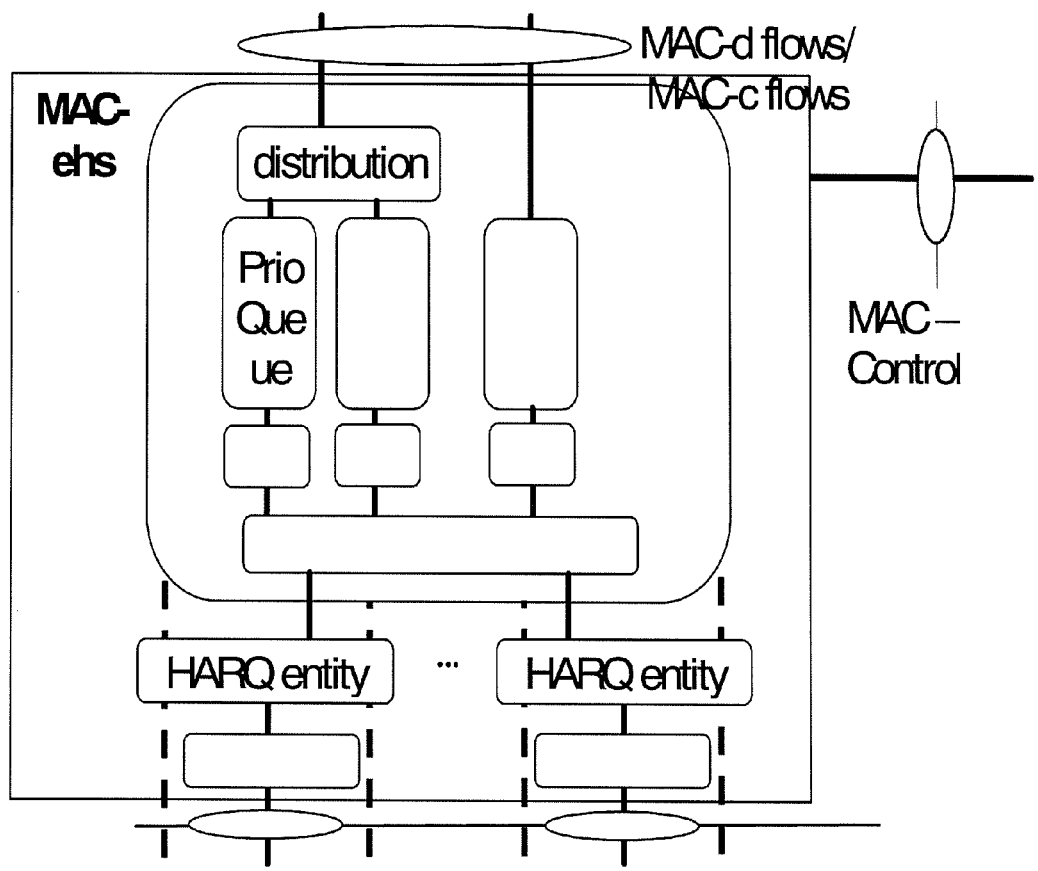
FIG. 2 is a simplified illustration of the UTRAN side MAC architecture/MAC-ehs.

FIG. 2 in a simplified manner illustrates the UMTS Terrestrial Radio Access Network (UTRAN) side MAC architecture/MAC-ehs located in Node B and which is defined in Third Generation Partnership project (3GPP) Technical specification (TS) 25.321 v11.0.0 Medium Access Control (MAC) protocol specification.

Figure 3:
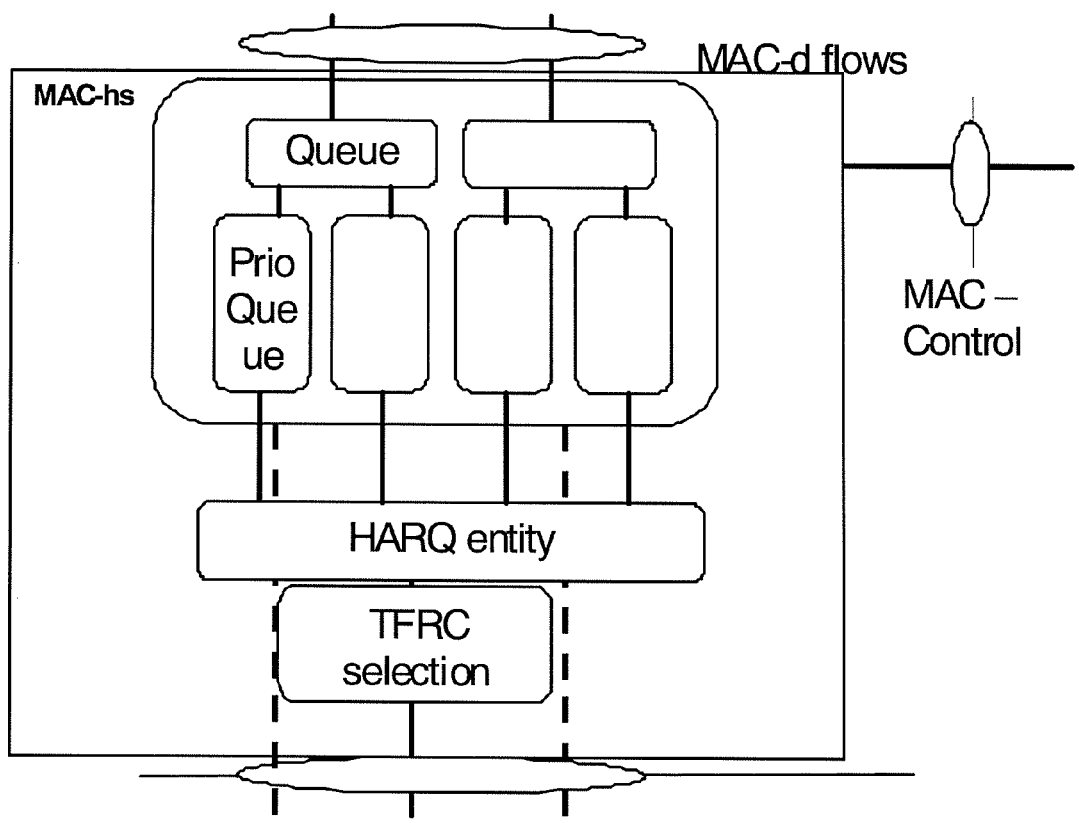
FIG. 3 is a simplified illustration of the UTRAN side MAC architecture/MAC-hs

FIG. 3 in a simplified manner illustrates the UTRAN side MAC architecture/MAC-hs located in Node B which is defined in 3GPP TS 25.321 v11.0.0 Medium Access Control (MAC) protocol specification.

The MAC-hs/MAC-ehs Priority Queues are used for communication in the downlink direction of data on transport channels of type high speed downlink shared channel (HS-DSCH).

A radio base station (or Node B) is in accordance with some embodiments adapted to generate a report signal comprising information indicating downlink performance associated with a data queue (e.g. a MAC-hs or MAC-ehs Priority Queue) and transmit the generated report signal to a Serving Radio Network Controller (SRNC) either directly or via a Drift Radio Network Controller (DRNC). Such a report can be termed Priority Queue status report.

The SRNC can in accordance with some embodiments be configured to request the Node B to generate the Priority Queue status report when certain Events occur, periodically and/or on demand. One example of a possible triggering condition that can constitute such an Event is when the Node B Frame Number (BFN) or Connection Frame Number (CFN) has reached a predefined value. The predefined value can be configurable. For example the predefined value can be received in the report request from the RNC. Another possible triggering condition is when the value of an information element included in the Priority Queue status report is assigned a new value. Yet another possible triggering condition is when a discard of one or several MAC-d Protocol Data Unit (PDU) is performed.

When the Priority Queue status report is generated, the Node B can be configured to include requested information elements in the Priority Queue status report. The report including the requested information can be sent to the SRNC at the next possible opportunity with regards to available transport network resources.

The SRNC can then in accordance with some embodiments be enabled to use this information when determining the amount of data that should be sent to each Node B in Multi Point operation to reach an efficient data transferring balance.

The SRNC can in accordance with some embodiments use this information to decide how much data to send to the source HS serving Node B before the HS serving cell change.

The SRNC can in accordance with some embodiments move load from flows assigned Iub links that experience congestion to flow assigned Iub links where no congestion is reported.

The SRNC can in accordance with some embodiments request the Node B to stop reporting Priority Queue status. The reporting can be stopped for a specified number of triggering conditions or for all triggering conditions previously requested.

The Priority Queue Status report can for example comprise one or several of the following information elements:
    a. Delay Reference Time (DRT) deviation data,
    b. Priority Queue length,
    c. Priority Queue drain rate,
    d. Priority Queue drain rate trend,
    e. Hybrid Automatic Repeat Request (HARQ) protocol statistics,
    f. PDU discard indicator,
    g. Downlink Connection Quality trend indicator.

The Delay Reference Time (DRT) deviation is based on a measurement of the Iub load, i.e. queuing delay over time and may be used as input to both an Iub congestion handling function and for determining the amount of data to send for each flow when multi flow HSDPA is configured. In accordance with some embodiments, when the RNC constructs a data frame containing the DRT extension, the DRT value is assigned the same value as the current RNC Frame Number (RFN). The frame is sent over the Iub interface towards a NodeB and exposed to a certain amount of queuing delay in the transport network. The frame is received by the NodeB. The NodeB reads the current BFN and calculates the difference towards the DRT value extracted from received user plane data frame. The delay reference time deviation is defined as the difference between the calculated DRT-BFN difference associated with the received frame and mean DRT-BFN difference for data frames received over time and associated with the same flow. A triggering condition for generating a Priority Queue status report can in some exemplary embodiments be when the delay reference time deviation differs with more than a defined threshold from the mean DRT-BFN difference. The threshold value can be derived from the node synchronization procedure or a preconfigured value, e.g. included in the SRNCs request for Priority Queue status reporting by the Node B, could be used. The Delay Reference Time data included in the Priority Queue Status report could include the difference between the threshold and measured value, and/or the measured value itself, and/or the length of time the threshold has been exceeded.

Priority Queue length represents the Priority Queue length at the moment the Priority Queue status report was generated.

Priority Queue drain rate indicate the rate at which data is drained/transmitted from the Priority Queue. It can be reported e.g. as number of PDUs per time unit or in bytes per time unit.

Priority Queue drain rate trend indicate how the drain rate is changing. It can be reported e.g. as increasing/decreasing and/or rate of increase/decrease.

The HARQ protocol statistics reflects statistics from the HARQ process indicating how frequent retransmissions occur. It can be reported e.g. as number of retransmission of MAC-hs PDU or MAC-ehs PDU for selected transport block size.

The PDU discard indicator indicates to the RNC that one or several MAC-d PDUs have been discarded. It can be reported as e.g. the number of PDUs that were discarded, the number of bytes that were discarded, or data derived from the PDUs payload (such as the RLC sequence number for each discarded PDU).

Downlink Connection Quality trend indicator indicates the trend (increasing/decreasing and/or rate of increase/decrease) for the downlink quality of the radio connection associated with the Priority Queue. E.g. when quality of the radio connection is improved, this is indicated by a positive Connection Quality trend indicator. The Downlink Connection Quality trend indicator may be derived from the Channel Quality Indicator (CQI) values reported by the UE.

If there are more than one High Speed Downlink Shared Channel (HS-DSCH) Priority Queue involved in downlink transmissions associated with a UE, the Node B can in some embodiments be configured to to report only the status of the Priority Queues which meet the trigger condition, or all the other Priority Queue status.

A HS-DSCH MAC-d Flow Identity (ID) and/or a Priority Queue ID may be included in the Priority Queue Status report, e.g. when the Priority Queue Status report is sent as a control plane frame, to identify the MAC-d flows and priority queue, if multiple HS DSCH MAC-d flow exists and Multiple Priority Queues can be associated with the same HS-DSCH MAC-d Flow ID. Also, when the Priority Queue Status report is sent over a user plane protocol, the Common Transport Channel Priority Indicator (CmCH-PI) can be included in the report to identify a specific flow/priority queue.

A Node B which supports queue monitoring and reporting can indicate this to RNC. This can in some embodiments be done by adding a new capability of such in the existing message AUDIT RESPONSE/RESOURCE STATUS INDICATION or by the RNC configuration.

Node Bs may be connected to the SRNC directly or via DRNC, therefore the below methods apply both in the context of Node B Application Part (NBAP) as described in 3GPP TS 25.433 and Radio Network Subsystem Application Part (RNSAP) as described in 3GPP TS 25.423 when they are related to the control plan, or Iub user plane protocols as described in 3GPP TS 25.435 and Iur user plane protocols as described in 3GPP TS 25.425 when they are related to the user plane.

SRNC Request the Node B to Start Priority Queue Status Reporting

The report characteristics may be on demand, and/or periodic if a report frequency is given, and/or Event triggered. The trigger conditions can be given by RNC, or in predefined rules in Node B. Below some exemplary implementations are set out:
1. Introduce a new measurement type. The report characteristics can be either "on demand" or "periodical" or "Event" based. Thresholds value on data stack can be set as criteria for Event based reporting. When the thresholds value is reached, the Node B will send the Priority Queue status report.
2. Add a new indicator to request Node B reporting in the existing dedicated Radio Link Handling message. For example: RADIO LINK SETUP REQUEST, RADIO LINK ADDITION REQUEST and RADIO LINK RECONFIGURATION PREPARE/RADIO LINK RECONFIGURATION REQUEST in the control plane messages.
3. Introduce new control plane messages for RNC to request Node B to do the reporting, and/or Node B to send back the report. In the new message, a choice can give so that the request apply to one or more Radio Links.
4. Indication in the user plane frames. For example, to add such an indicator in the HS-DSCH data frame in the existing spare bits, or in the spare extension. The indicator can also be added in an existing control frame, for example in HS-DSCH CAPACITY REQUEST control frame.
5. Introduce new control frame in the User plane frame protocol.

Node B Priority Queue Status Reporting

A Node B supporting data queue reports generates reports for Priority Queue Status on demand, periodically or triggered by Event(s), depending on the request type. When the Event based queue status reporting is requested, a Node B can be configured to report when triggered by an event such as any of the following events:
- Node B may report during Radio Link Reconfiguration when the Radio Link is removed as the serving Radio Link in the HS serving cell change case. Node B may report when certain thresholds value is reached.
- Node B may report to SRNC when there is congestion/data drop. Node B is today capable of detecting both Transport Network (TN) and WCDMA radio interface (Uu) congestion. When there is a congestion situation in Node B or Node B detects a data drop, Node B sends the report to SRNC.
- Node B may report to SRNC when the data is discarded. The PDU discards in NodeB are CFN-triggered (i.e. ordered by the RNC) and the NodeB can read out the amount of bytes stored in the Priority Queue (PQ) buffer before any data is discarded, and report this to SRNC.
- Node B may report to SRNC Delay Reference Time (DRT) deviation when corresponding parameters exceeds a threshold value.

There are several different alternatives for how the NodeB may report Priority Queue status:
1. One alternative is to add a new report type in an existing measurement report.
2. Another alternative is to introduce a new control plane message.
3. Yet another alternative is to add the new report in the user plan, either in the data frame, or in the existing control frame, or introduce a new control frame.

An SRNC may use the information reported by Node B e.g. when deciding how to divide data that should be transferred to Node Bs in Multi flow operation to reach the best data transferring balance.

Also an SRNC can use the information reported by Node B to decide how much data to send to the current HS serving Node B before the HS serving cell change.

Further, when the Node B indicates data being discarded, an SRNC may use the information to decide how to perform retransmission.

In accordance with some embodiments an SRNC can be enabled to request a Node B to stop reporting Queue status. This can be by indicated implicitly when the Radio Link becomes HS non-serving cell, or by sending stop indication explicitly.
1. If the indication to start the reporting is introduced as new measurement type, it can be stopped by a new measurement type in measurement stop.
2. Another possible mechanism that can be used is to introduce a new control plane message. A new control plane message can start/stop Node B Priority Queue on the HS radio Link.

3. Yet another possible mechanism is to add the new report in the user plan, either in the existing data frame, or existing control frame, or introduce a new control frame.

The signaling described above between an SRNC and a Node B can be performed in the control plane for example by modifying the existing control plane messages or introducing a new message. The signaling described above between an SRNC and a Node B can in an alternative embodiments be performed in the user plan, by modifying the existing user plane message (control frame or data frame), or introducing a new control frame. The signaling can also be a mixture of the two. For example, SRNC can request via the down link data frame or control plane NBAP/RNSAP message, and Node B can send back report in a new control frame in the user plan.

Figure 4:
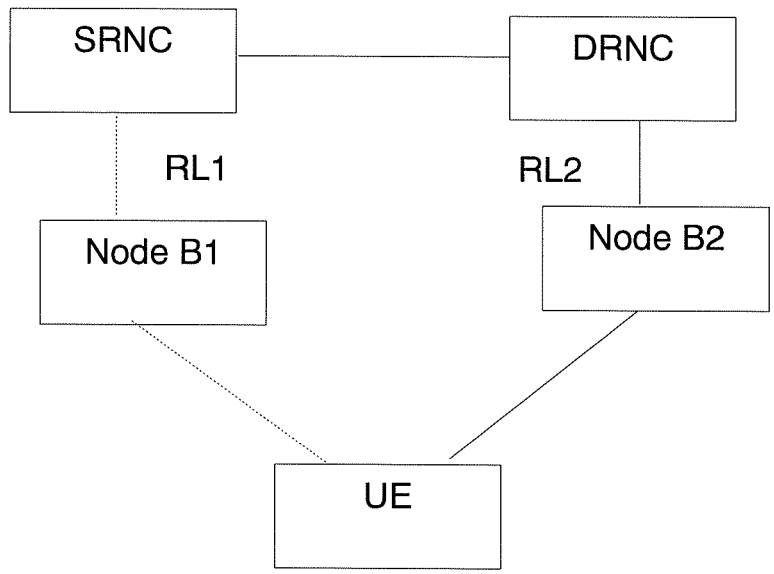
FIG. 4 illustrates a HS serving cell change scenario.

In FIG. 4 a HS serving cell change scenario where the Node Bs (NodeB1 and Node B2) are connected to two different RNCs (SRNC and DRNC). There is a Iur connection between the two RNCs. Before the HS serving cell change, Radio Link 1 (RL1) is the serving radio link. HS data is sent on RL1 between a first NodeB (Node B1) and a UE. After the HS serving cell change, Radio Link 2 (RL2) is the serving radio link, HS data is sent on RL2 between a second NodeB (Node B2) and the UE. The Node Bs may in some scenarios be controlled by the same RNC.

Figure 5:
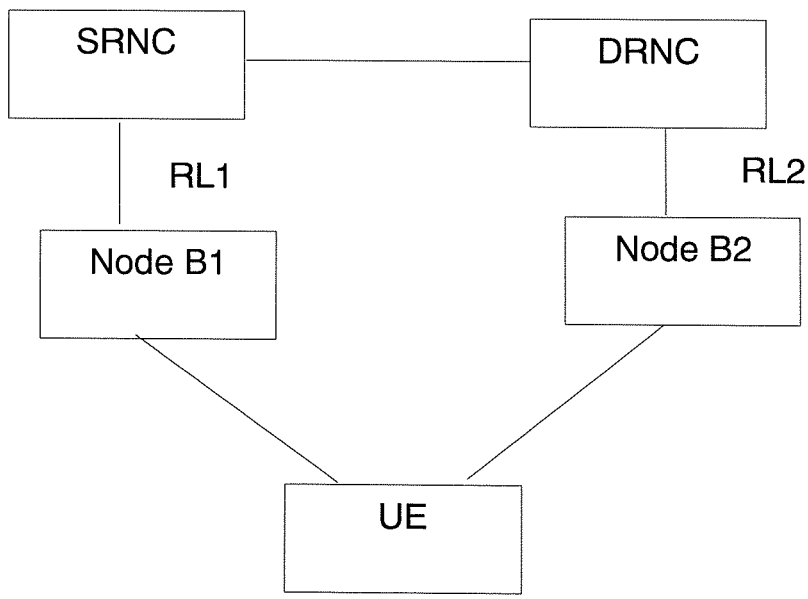
FIG. 5 illustrates multi point transmission.

In FIG. 5 multi point transmission when Node Bs are controlled by two different RNCs, SRNC and DRNC, is illustrated. There is an Iur connection between the two RNCs. Before RL2 is added, RL1 is the serving radio link for the UE. After RL2 is added, RL1 is the primary serving radio link; RL2 is the secondary serving radio link for the UE. HS data is sent on both Radio Links to the UE. The Node Bs may in some scenarios be controlled by the same RNC. In other exemplary implementations involving of HS serving cell change and multi point transmission, the Node Bs may be connected to the same RNC and there may be no Iur connection involved.

Figure 6:
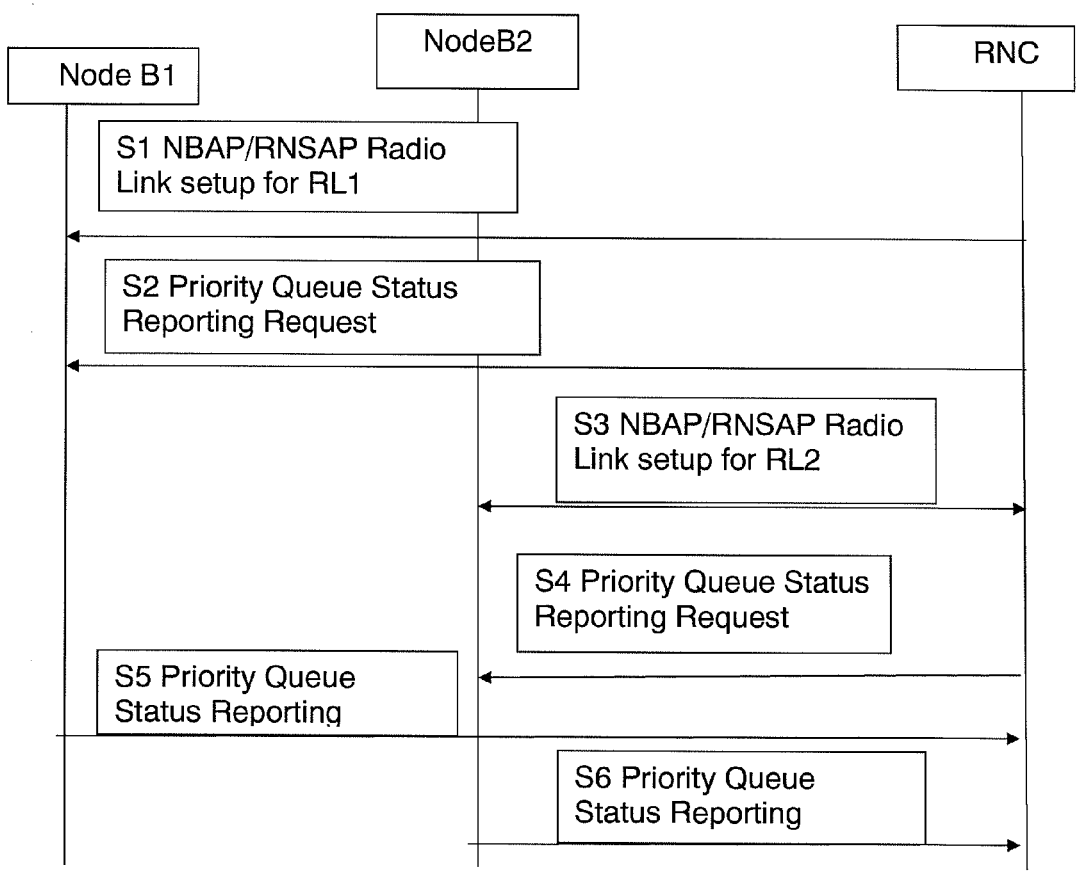
FIG. 6 illustrates communication between RNC and NodeBs during MP transmission.

The diagram in FIG. 6 illustrates the communication between RNC and NodeBs during MP transmission.

First in a step S1 a first HS Radio Link (RL1) is setup towards a first radio base station Node B1 from an RNC. The response message from Node B1 to RNC is omitted in FIG. 6. Next in a step S2 the RNC (acting as SRNC) request a Priority Queue status reporting from Node B1. The RNC may request the report to be sent on demand, or periodical, or when certain thresholds value given is reached. For example the request in step S2 can be a control signal defining the set of monitored triggering conditions to be applied by the radio base station. In accordance with another example the request in step S2 can be a control signal from the radio network controller requesting the report signal to be periodically generated and transmitted with a given periodicity. Then in a step S3 a second HS Radio Link (RL2) is setup towards a second radio base station Node B2. The response message from Node B to RNC is omitted in FIG. 6. Next, in a step S4 the RNC request a Priority Queue status reporting from Node B2. The RNC may request the report to be sent on demand, or periodical, or when certain thresholds value given is reached. For example the request in step S4 can be a control signal defining the set of monitored triggering conditions to be applied by the radio base station. In accordance with another example the request in step S4 can be a control signal from the radio network controller requesting the report signal to be periodically generated and transmitted with a given periodicity. Next in a step S5 Node B1 generates and sends a Priority Queue status report to RNC. Node B1 may send the report when the trigger condition is reached, thresholds value is reached, or upon demand, or periodical. The Priority Queue status report is a report signal comprising information indicating downlink performance associated with a data queue in the radio base station. Also in a step S6 Node B2 generates and sends a Priority Queue status report to SRNC. The Priority Queue status report is a report signal comprising information indicating downlink performance associated with a data queue in the radio base station. The information indicating downlink performance can for example be one or many of:

delay reference time deviation data;
    data queue length,
    data queue drain rate,
    data queue drain rate trend,
    Hybrid Automatic Repeat Request, HARQ, protocol statistics,
    an indication whether one or more protocol data units have been discarded,
    an indication of downlink connection quality trend.

When the radio base station is configured to monitor triggering conditions the monitored triggering conditions can includes one or more of:

Node B Frame Number, BFN, or Connection Frame Number, CFN, having reached a predefined valued;
    a parameter value included in a previously transmitted report signal has been assigned a new value;
    a parameter value is above a first threshold (the parameter value may be included in the report signal);
    a parameter value is below a second threshold (the parameter value may be included in the report signal);
    one or several MAC-d protocol data units have been discarded;
    the length of the data queue exceeds a third threshold value;
    the length of the data queue is below a fourth threshold value.

The Priority Queue status reports may occur in different order, or may be repeated. When the RNC has received reported downlink performance associated with the data queue, data transmitted for transmission to a user equipment via the radio base station can be scheduled while accounting for the reported downlink performance associated with the data queue.

Figure 7:
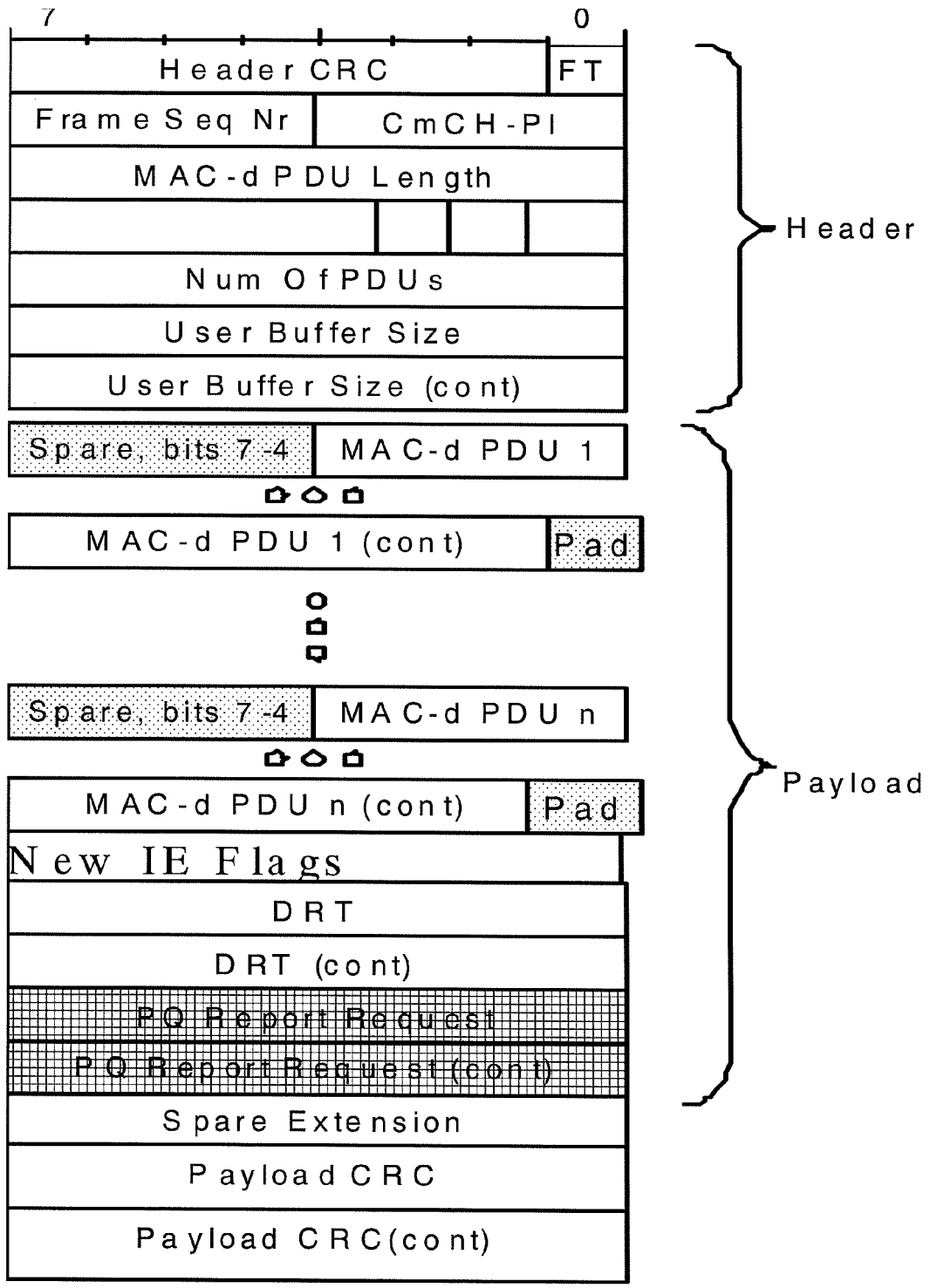
FIG. 7 is a schematic view of a User Plane frame.

In FIG. 7 the User Plane (UP) frame of 25.435 v10.4.0 UTRAN Iub interface user plane protocols for Common Transport Channel data streams, see chapter 6.2.6A, is schematically depicted. FIG. 7 further illustrates in an exemplary embodiment how the standard protocol can be modified so that SRNC can send Priority Queue Status Reporting request to Node B by modifying the existing HS-DSCH DATA FRAME TYPE 1 structure. Thus, in FIG. 7:

Bit 0 of New Information Element (IE) Flags in HS-DSCH DATA FRAME TYPE 1 indicates if a Delay Reference Time (DRT) is present (1) or not (0) in the 2 octets following the New IE Flags IE.
    Bit 1 of NEW IE Flags in HS-DSCH DATA FRAME TYPE 1 indicates if a Priority Queue (PQ) Report Request is present (1) or not (0) in the following 2 octets. In this example, 2 octets are used. It could be one or several bits or several octets.
    Bits 2 through 6 of New IE Flags in HS-DSCH DATA FRAME TYPE 1 shall be set to 0.

Field length of Spare Extension IE in HS-DSCH DATA FRAME TYPE 1 is 0-27 octets.

Similar modification can be done on HS-DSCH DATA FRAME TYPE 2 in 3GPP TS 25.435 v10.4.0 UTRAN Iub interface user plane protocols for Common Transport Channel data streams.

Similar modification can also be done on HS-DSCH DATA FRAMs in Iur User plane in 3GPP TS 25.425 v10.2.0 UTRAN Iur interface user plane protocols for Common Transport Channel data streams.

Stop of the PQ Status Reporting can be done in the similar way, by using 1 or more spare bits, or bits in the spare extension.

Figure 8:
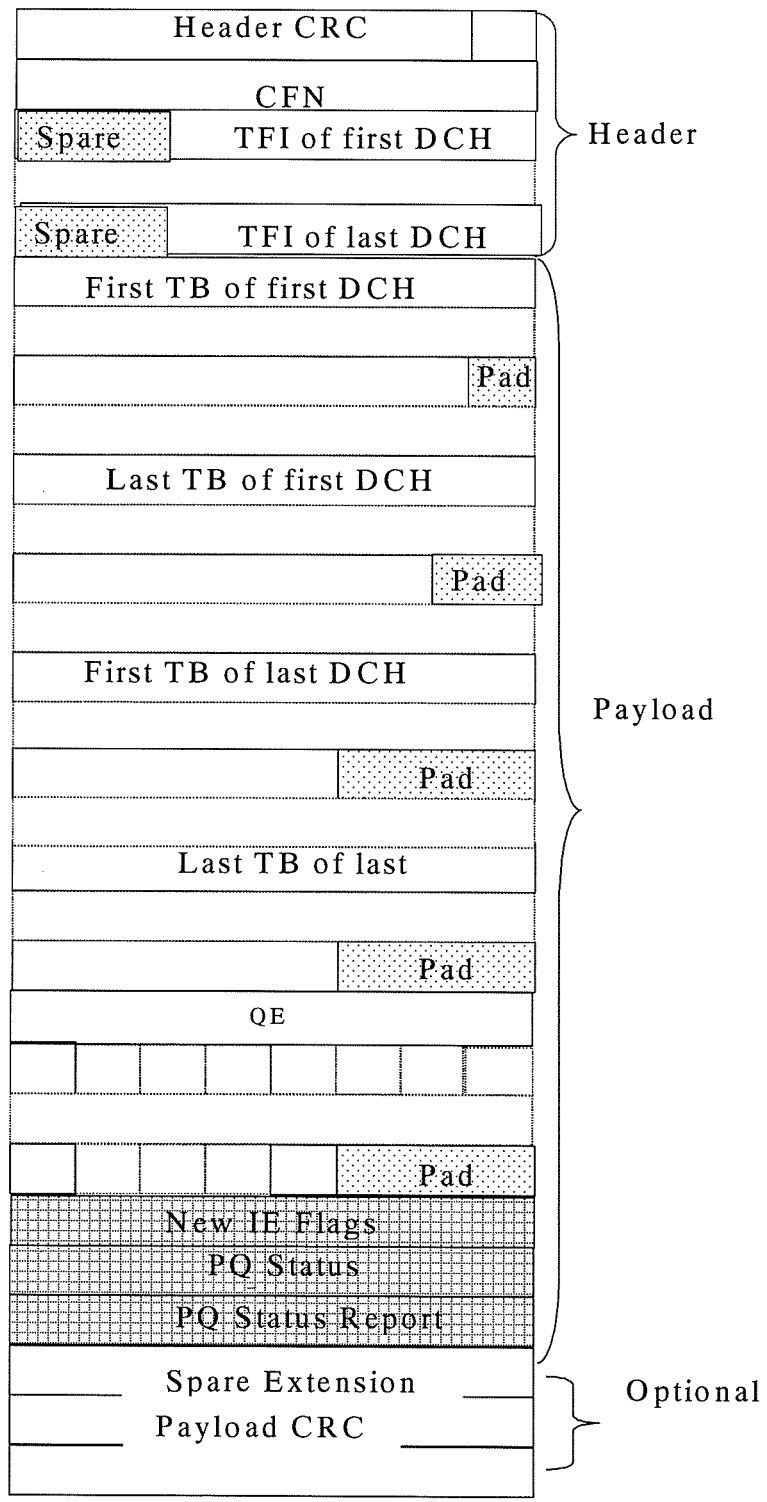
FIG. 8 is a schematic illustration of an exemplary Priority Queue Status Report.

FIG. 8 schematically illustrates an exemplary implementation of a Priority Queue Status Report sent to SRNC from a Node B. In the example in FIG. 8 the existing data frame DCH or E-DCH DATA FRAME of 3GPP TS 25.427 v11.0.0 UTRAN Iub/Iur interface user plane protocol for DCH data streams chapter 6.2.2.1 UL DATA FRAME FOR DCH has been modified.

Bit 0 of New IE Flags in UL DATA FRAME in FIG. 8 indicates if a PQ Status Report is present (1) or not (0) in the 2 octets following the New IE Flags IE. In this example, 2 octets are used. It could be one or several bits or several octets.

Bits 1 through 6 of New IE Flags in UL DATA FRAME in FIG. 8 shall be set to 0.

Similar change can be done for UL DATA FRAME FOR E-DCH TYPE 1 and UL DATA FRAME FOR E-DCH TYPE 2.

Figure 9:
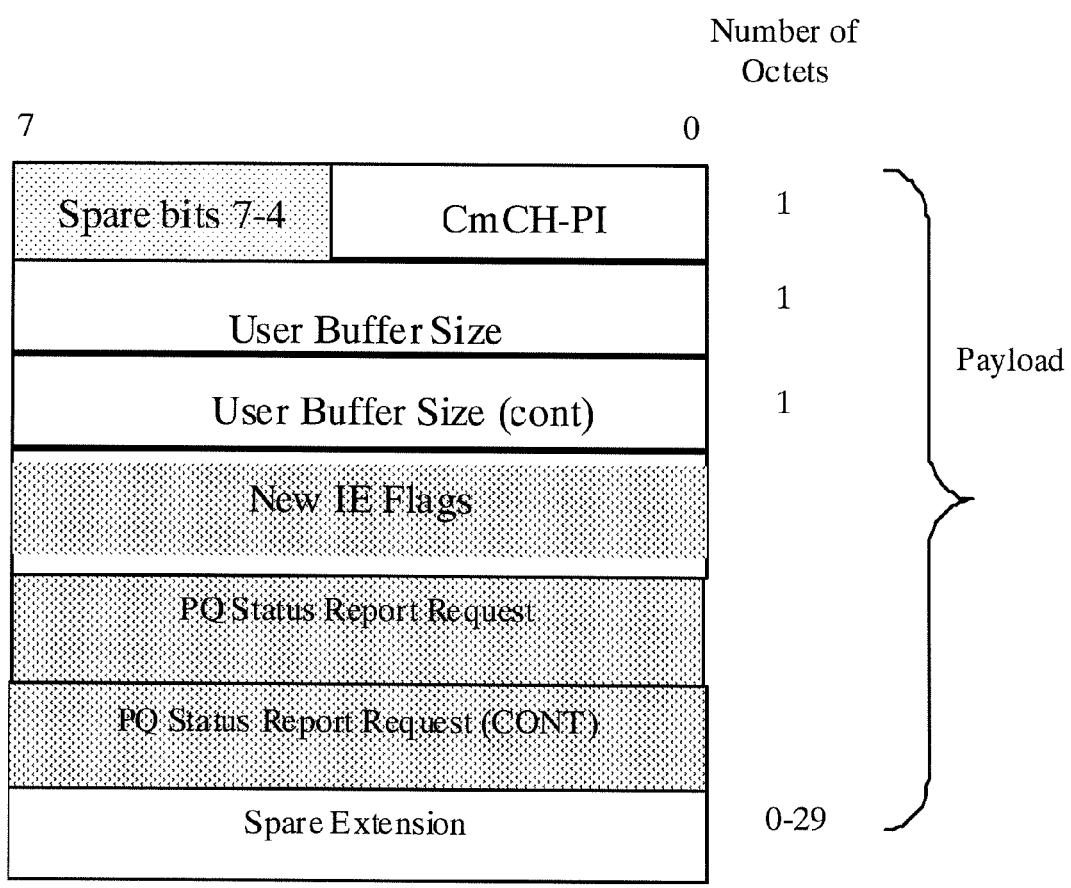

In FIG. 9 an exemplary implementation for a SRNC to request the Node B to report the Priority Queue via modifying the existing Control FRAME is illustrated. FIG. 9 schematically depicts the payload structure of the UP frame of 3GPP TS 25.435 v10.4.0 UTRAN Iub interface user plane protocols for Common Transport Channel data streams chapter 6.3.3.10 HS-DSCH CAPACITY REQUEST.

Bit 0 of New IE Flags in CAPACITY REQUEST indicates if a PQ Status Report Request is present (1) or not (0) in the 2 octets following the New IE Flags IE.

In this example, 2 octets are used. It could be one or several bits or several octets for SRNC to request Node B to report Priority Queue Status Report.

A similar modification can be made on 25.425 CAPACITY REQUEST in Iur the User plane (UP) Protocol as described in 3GPP TS 25.425 v10.2.0 UTRAN Iur interface user plane protocols for Common Transport Channel data streams. The stop of the PQ status Reporting can be performed in a similar way.

FIG. 10 illustrates an exemplary implementation to be used by a Node B when reporting a Priority Queue via a modified existing Control FRAME to an SRNC. In FIG. 10 a modified structure of 3GPP TS 25.435 v10.4.0 UTRAN Iub interface user plane protocols for Common Transport Channel data streams, chapter 6.3.3.11, HS-DSCH CAPACITY ALLOCATION Type 1 is schematically depicted.

Bit 0 of New IE Flags in CAPACITY ALLOCATION TYPE 1 indicates if a PQ Status Report is present (1) or not (0) in the 4 octets following the New IE Flags IE.

In the example depicted in FIG. 10, 4 octets are used. It could be one or several bits or several octets for Node B to report to SRNC the Priority Queue Status Report.

A similar modification can be made to the CAPACITY ALLOCATION TYPE 2, and to the CAPACITY ALLOCATION described in 3GPP TS 25.425 v10.2.0 UTRAN Iur interface user plane protocols for Common Transport Channel data streams.

In FIGS. 11*a-d* exemplary implementations of an SRNC requesting a Priority Queue Status report and a Node B sending the Priority Queue Status report by introducing new signaling in Node B Application Part/Radio Network Subsystem Application Part NBAP/RNSAP control plane, or Iur/Iub user plane. If the Node B is controlled by DRNC, SRNC will request and receive the report via DRNC.

Priority Queue Status Report Request

Figure 11A:
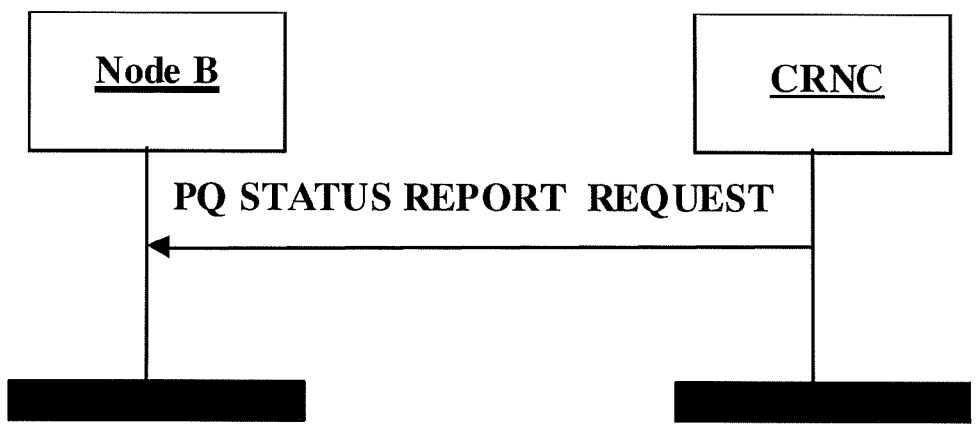
FIGS. 11a-d illustrates exemplary implementations of an SRNC request for a Priority Queue Status report and a Node B reporting the Priority Queue Status report.

FIG. 11*a* shows the NBAP or Iub signaling. The CRNC send a request for a PQ status report to the Node B. The Controlling RNC (CRNC) may be SRNC or DRNC.

Figure 11B:
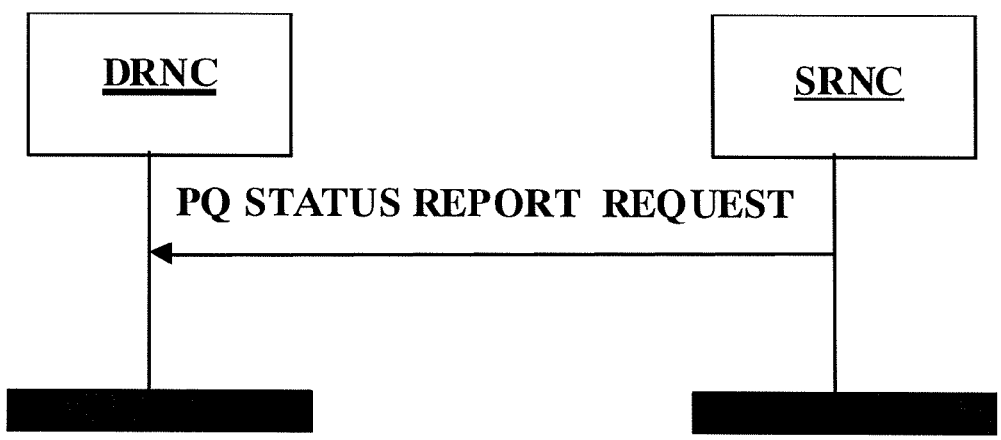

FIG. 11*b* shows the RNSAP or Iur signaling when the Node B is controlled by DRNC. The SRNC sends a request for a PQ status report to the DRNC.

The PQ Status Report Request procedure provides means for the SRNC to request/stop a Node B Priority Queue status reporting for HS Radio Link(s).

The SRNC may request the Priority Queue status reporting on demand/periodical/event based. SRNC can stop a previous reporting request.

The SRNC may setup threshold values for Node B to monitor. When the threshold values are reached, Node B then reports the Priority Queue Status.

Priority Queue Status Report

Figure 11C:
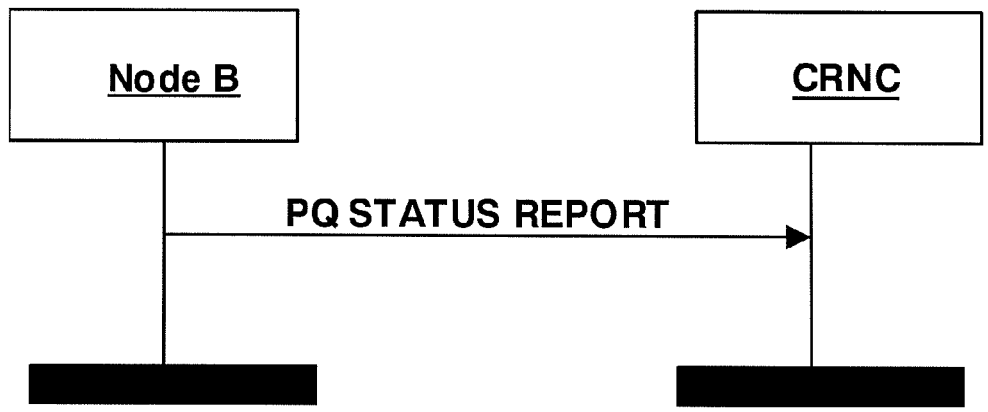

FIG. 11*c* shows the NBAP or Iub signaling. The Node B sends a PQ status report to the CRNC. The CRNC may be an SRNC or a DRNC.

Figure 11D:
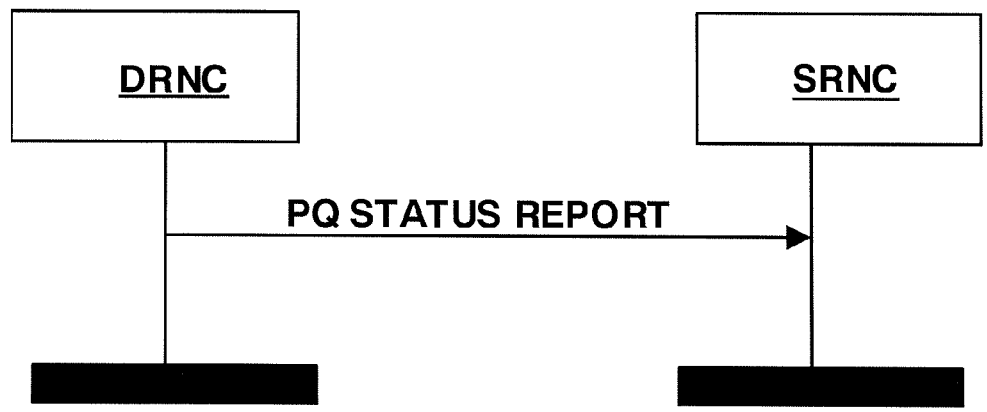

FIG. 11*d* shows RNSAP or Iur signaling when the Node B is controlled by DRNC. The DRNC sends the PQ status report to the SRNC.

A PQ Status Report procedure is generated within the Node B. It may be generated either in response to a PQ Status Report Request or at another time. The Node B may use this message to report, at any time, when the trigger conditions are reached.

Below an exemplary modified Dedicated Measurement in the control plan is illustrated. The below example is from 3GPP TS 25.433 v11.0.0 UTRAN Iub interface Node B Application Part (NBAP) signaling chapter 9.1.52 DEDICATED MEASUREMENT INITIATION REQUEST.

| IE/Group Name | Presence | Range | IE Type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | reject |
| Transaction ID | M | | 9.2.1.62 | | — | |
| Node B Communication Context ID | M | | 9.2.1.48 | The reserved value "All NBCC" shall not be used when the Report characteristics type is set to "On Demand". | YES | reject |

-continued

| IE/Group Name | Presence | Range | IE Type and Reference | Semantics Description | Criticality | Assigned Criticality |
|---|---|---|---|---|---|---|
| Measurement ID | M | | 9.2.1.42 | | YES | reject |
| CHOICE Dedicated Measurement Object Type | M | | | | YES | reject |
| >RL | | | | | | |
| >>RL Information | | 1 ... <maxno ofRLs> | | | EACH | reject |
| >>>RL ID | M | | 9.2.1.53 | | — | |
| >>>DPCH ID | O | | 9.2.3.5 | TDD only | — | |
| >>>PUSCH Information | | 0 ... <maxno ofPUSCHs> | | TDD only | GLOBAL | reject |
| >>>>PUSCH ID | M | | 9.2.3.12 | | — | |
| >>>HS-SICH Information | | 0 ... <maxno ofHSSICHs> | | TDD only | GLOBAL | reject |
| >>>>HS-SICH ID | M | | 9.2.3.5Gb | For 1.28Mcps TDD, if the Extended HS-SICH ID IE is included in the HS-SICH Information IE, the HS-SICH ID IE shall be ignored | — | |
| >>>>Extended HS-SICH ID | O | | 9.2.3.5K | Applicable to 1.28Mcps TDD only, the Extended HS-SICH ID IE shall be used if the HS-SICH identity has a value larger than 31. See note 1 below. | — | |
| >>>DPCH ID 7.68Mcps | O | | 9.2.3.42 | Included for 7.68Mcps TDD for downlink DPCH FDD only | YES | reject |
| >RLS | | | | | | |
| >>RL Set Information | | 1 ... <maxno ofRLSets> | | | — | |
| >>>RL Set ID | M | | 9.2.2.39 | | — | |
| >ALL RL | NULL | | NULL | | | |
| >ALL RLS | NULL | | NULL | FDD only | | |
| Dedicated Measurement Type | M | | 9.2.1.23 | | YES | reject |
| Measurement Filter Coefficient | O | | 9.2.1.41 | | YES | reject |
| Report Characteristics | M | | 9.2.1.51 | | YES | reject |
| CFN Reporting Indicator | M | | FN Reporting Indicator 9.2.1.29B | | YES | reject |
| CFN | O | | 9.2.1.7 | | YES | reject |
| Number Of Reported Cell Portions | C-BestCellPortions Meas | | 9.2.2.23D | FDD only | YES | reject |
| Measurement Recovery Behavior | O | | 9.2.1.43A | | YES | ignore |
| Alternative Format Reporting Indicator | O | | 9.2.1.1B | | YES | ignore |
| Number Of Reported Cell Portions LCR | C-BestCellPortions Meas LCR | | 9.2.3.108 | 1.28Mcps TDD only | YES | reject |

Note 1:
This information element is a simplified representation of the ASN.1.

The below table is from 3GPP TS 25.433 v11.0.0 UTRAN Iub interface Node B Application Part (NBAP) signaling, chapter 9.2.1.23: Dedicated Measurement Type. The Dedicated Measurement Type identifies the type of measurement that shall be performed. PQ Status Reporting can be added as a new measurement type.

| IE/Group Name | Presence | Range | IE Type and Reference | Semantics Description |
|---|---|---|---|---|
| Dedicated Measurement Type | | | ENUMERATED (SIR, SIR Error, Transmitted Code Power, RSCP, Rx Timing Deviation, Round Trip Time, . . . , Rx Timing Deviation LCR, Angle Of Arrival LCR, HS-SICH reception quality, Best Cell Portions, Rx Timing Deviation 7.68 Mcps, Rx Timing Deviation 3.84 Mcps Extended, Best Cell Portions LCR, AOA per Cell Portion LCR, PQ Status Reporting) | "RSCP" and "HS-SICH reception quality" are used by TDD only. "Rx Timing Deviation" and "Rx Timing Deviation 3.84 Mcps Extended" are used by 3.84 Mcps TDD only. "Rx Timing Deviation LCR", "Angle Of Arrival LCR" are used by 1.28 Mcps TDD only. "Round Trip Time", "SIR Error" are used by FDD only. "Best Cell Portions" is used by FDD only. "Best Cell Portions LCR" is used by 1.28 Mcps TDD only. "Rx Timing Deviation 7.68 Mcps" is used by 7.68 Mcps TDD only. |

Note:
For definitions of the measurement types refer to 3GPP TS 25.215 and 3GPP TS 25.225.

Below is a table from 3GPP TS 25.433 v11.0.0 UTRAN Iub interface Node B Application Part (NBAP) signaling, chapter 9.1.55, DEDICATED MEASUREMENT REPORT.

A PQ Status Report can be added as a new IE in the Dedicated Measurement Value IE in the Dedicated Measurement Value Information IE.

| IE/Group Name | Presence | Range | IE Type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | ignore |
| Transaction ID | M | | 9.2.1.62 | | — | |
| CRNC Communication Context ID | M | | 9.2.1.18 | The reserved value "All CRNCCC" shall not be used. | YES | ignore |
| Measurement ID | M | | 9.2.1.42 | | YES | ignore |
| CHOICE Dedicated Measurement Object Type | M | | | Dedicated Measurement Object Type the measurement was initiated with See Note 1 | YES | ignore |
| >RL or ALL RL | | | | | | |
| >>RL Information | | 1 . . . <maxno ofRLs> | | | EACH | ignore |
| >>>RL ID | M | | 9.2.1.53 | | — | |
| >>>DPCH ID | O | | 9.2.3.5 | TDD only | — | |
| >>>Dedicated Measurement Value Information | M | | 9.2.1.24A | | | |
| >>>PUSCH Information | | 0 . . . <maxno ofPUSCHs> | | TDD only See note 3 | GLOBAL | reject |
| >>>>PUSCH ID | M | | 9.2.3.12 | | — | |
| >>>>Dedicated Measurement Value | O | | 9.2.1.24 | | — | |
| >>>HS-SICH ID | O | | 9.2.3.5Gb | TDD only For 1.28Mcps TDD, if the Extended HS-SICH ID IE is included in the HS-SICH Information IE, the HS-SICH ID IE shall be ignored | YES | reject |
| >>>DPCH ID 7.68Mcps | O | | 9.2.3.42 | Included for 7.68Mcps TDD for downlink DPCH | YES | reject |

-continued

| a<br>IE/Group Name | b<br>Presence | c<br>Range | d<br>IE Type and Reference | e<br>Semantics Description | f<br>Criticality | g<br>Assigned Criticality |
|---|---|---|---|---|---|---|
| >>>Extended HS-SICH ID | O | | 9.2.3.5K | Applicable to 1.28Mcps TDD only, the Extended HS-SICH ID IE shall be used if the HS-SICH identity has a value larger than 31. | YES | ignore |
| >RLS or ALL RLS | | | | FDD only See Note 2 | | |
| >RL Set Information | | 1 ... <maxnoofRLSets> | | | EACH | ignore |
| >>>RL Set ID | M | | 9.2.2.39 | | — | |
| >>>Dedicated Measurement Value Information | M | | 9.2.1.24A | | — | |
| Measurement Recovery Reporting Indicator | O | | 9.2.1.43B | | YES | ignore |

Using methods and devices as described herein provide advantages. Such advantages typically include end user service performance improvements to data services over HS-DSCH and network performance for data transport over HS-DSCH.

The end user data service performance improvements may be achieved through reduced silence gaps in the data stream as received in the user equipment when the user equipment is moving around. Network performance improvements may be achieved through improved usage of radio and transport network resources. Embodiments as described herein are applicable both when single flow HS-DSDPA as well as when multiple flow HS-DSDPA are configured.

The HS Cell Change procedure performance may be improved significantly. This can be achieved through fast layer 2 retransmission of PDUs discarded in the source cell based on PDU discard indicator signaled in the Priority Queue report to the SRNC. Additionally, the number of discarded PDUs at HS cell change may be kept low when the Node B is keeping the RNC updated with current Priority Queue length together with Priority Queue drain rate.

Data distribution between multiple flows when MF-HSDPA is configured can be improved based on Priority Queue length together with the Priority Queue drain measurement as reported from all involved Node B. The data rate for a specific flow can be decided based upon the reported Priority Queue length for the flow weighted by the Priority Queue drain rate and compared to the other configured MF-HSDPA flows. It should be noted that the maximum data rate for a specific HS-DSCH MAC-d PDU flow may be limited by the allocated data grant, as communicated via the CAPACITY ALLOCATION control frame. Performance impairments caused by Iub congestion can be mitigated or minimized through load balancing performed on data flows configured with MF-HSDPA. The DRT deviations, as reported by each involved Node B, can be used as input. To be compared with the Node B centric method currently used where the flow control is applied per HS-DSCH MAC-d PDU flow.

The invention claimed is:

1. A method in a radio base station for signal interaction with a radio network controller, the method comprising:
    the radio base station receiving, from the radio network controller, a control signal that defines a set of monitored triggering conditions for triggering reporting of downlink performance;
    in response to detecting that one of the set of triggering conditions is fulfilled, the radio base station performing the following:
        generating a report signal comprising information indicating downlink performance associated with a data queue in the radio base station, wherein said information in the report signal comprises at least one of: a) data queue length, b) data queue drain rate, c) data queue drain rate trend, and d) Hybrid Automatic Repeat Request (HARQ) protocol statistics, and
        transmitting the generated report signal to the radio network controller; and
    the radio base station receiving, from the radio network controller, data to be transmitted to a user equipment UE), the amount of data received being based on the generated report signal.

2. The method according to claim 1, wherein the set of monitored triggering conditions includes one or more of:
    Node B Frame Number (BFN) or Connection Frame Number (CFN) having reached a predefined value;
    a parameter value included in a previously transmitted report signal has been assigned a new value;
    a parameter value is above a first threshold value;
    a parameter value is below a second threshold value;
    one or several MAC-d protocol data units have been discarded;
    the length of the data queue exceeds a third threshold value; and
    the length of the data queue is below a fourth threshold value.

3. The method according to claim 1, wherein the report signal is a user plane data frame comprising said information indicating downlink performance associated with said data queue in the radio base station.

4. The method according to claim 1, wherein the data queue is used for buffering data belonging to a downlink data flow associated with a first user equipment.

5. The method according to claim 1, wherein the data queue is a Medium Access Control (MAC)-hs or MAC-ehs Priority Queue.

6. A method in a radio network controller for signal interaction with a radio base station, the method comprising:
    the radio network controller transmitting, to the radio base station, a control signal that defines a set of monitored triggering conditions, each of which triggers the radio base station reporting downlink performance to the radio network controller;

the radio network controller receiving a report signal from the radio base station, the report signal comprising information indicating downlink performance associated with a data queue in the radio base station, wherein the information in the report signal comprises at least one of: a) data queue length, b) data queue drain rate, c) data queue drain rate trend, and d) Hybrid Automatic Repeat Request (HARQ) protocol statistics;

the radio network controller determining, based on information in the report signal, how much data to send to the radio base station, the data to be transmitted by the radio base station to a user equipment (UE); and the radio network controller transmitting the determined amount of data to the radio base station.

7. The method according to claim 6, wherein the set of monitored triggering conditions includes one or more of:
Node B Frame Number (BFN) or Connection Frame Number (CFN) having reached a predefined value;
a parameter value included in a previously transmitted report signal has been assigned a new value;
a parameter value is above a first threshold value;
a parameter value is below a second threshold value;
one or several MAC-d protocol data units have been discarded;
the length of the data queue exceeds a third threshold value; and
the length of the data queue is below a fourth threshold value.

8. The method according to claim 6, wherein the report signal is a user plane data frame comprising said information indicating status of at least one data queue in the radio base station.

9. The method according to claim 6, wherein the data queue is used for buffering data belonging to a downlink data flow associated with a first user equipment.

10. The method according to claim 9, wherein the method further includes scheduling data for transmission to the first user equipment via the radio base station while accounting for the reported downlink performance associated with the data queue.

11. The method according to claim 6, wherein the data queue is a Medium Access Control (MAC)-hs or MAC-ehs Priority Queue.

12. A radio base station comprising:
a memory configured to hold data of one or more data queues;
digital data processing circuitry configured to:
receive, from the radio network controller, a control signal that defines a set of monitored triggering conditions for triggering reporting of downlink performance;
in response to detecting that one of the set of triggering conditions is fulfilled, generate a report signal comprising information indicating downlink performance associated with a first data queue among said one or more data queues, wherein said information in the report signal comprises at least one of: a) data queue length, b) data queue drain rate, c) data queue drain rate trend, and d) Hybrid Automatic Repeat Request (HARQ) protocol statistics; and
a network interface circuit, operably connected to the digital data processing circuitry, and configured to:
in response to detecting that one of the set of triggering conditions is fulfilled, transmit the generated report signal to a radio network controller; and
receive, from the radio network controller, data to be transmitted to a user equipment (UE), the amount of data received being based on the generated report signal.

13. The radio base station according to claim 12, wherein the set of monitored triggering conditions includes one or more of:
Node B Frame Number (BFN) or Connection Frame Number (CFN) having reached a predefined value;
a parameter value included in a previously transmitted report signal has been assigned a new value;
a parameter value is above a first threshold value;
a parameter value is below a second threshold value;
one or several MAC-d protocol data units have been discarded;
the length of the data queue exceeds a third threshold value; and
the length of the data queue is below a fourth threshold value.

14. The radio base station according to claim 12, wherein the data queue is used for buffering data belonging to a downlink data flow associated with the UE.

15. The radio base station according to claim 12, wherein the data queue is a Medium Access Control (MAC)-hs or MAC-ehs Priority Queue.

16. A radio network controller (RNC), comprising:
a network interface circuit configured for signal interaction with a radio base station and configured to:
transmit, to the radio base station, a control signal that defines a set of monitored triggering conditions, each of which triggers the radio base station reporting downlink performance to the radio network controller:
receive a report signal from the radio base station, the report signal comprising information indicating downlink performance associated with a data queue in the radio base station, wherein said information in the report signal comprises at least one of: a) data queue length, b) data queue drain rate, c) data queue drain rate trend, and d) Hybrid Automatic Repeat Request (HARQ) protocol statistics; and
digital processing circuitry configured to determine an amount of data to send to the radio base station based on the information in the report signal, wherein the network interface circuit is further configured to transmit the determined amount of data to the radio base station.

17. The radio network controller according to claim 16, wherein the defined set of monitored triggering conditions includes one or more of:
Node B Frame Number (BFN) or Connection Frame Number (CFN), having reached a predefined value;
a parameter value included in a previously transmitted report signal has been assigned a new value;
a parameter value is above a first threshold value;
a parameter value is below a second threshold value;
one or several MAC-d protocol data units have been discarded;
the length of the data queue exceeds a third threshold value; and
the length of the data queue is below a fourth threshold value.

18. The radio network controller according to claim 16, wherein the data queue is used for buffering data belonging to a downlink data flow associated with the UE.

19. The radio network controller according to claim 16, wherein the data queue is a Medium Access Control (MAC)-hs or MAC-ehs Priority Queue.

20. The method of claim 6, wherein the radio base station is a source serving base station, and wherein determining how much data to send to the radio base station comprises determining how much data to send to the source serving base station before a serving cell change.

21. The method of claim 20, wherein the radio network controller is in communication with at least two radio base stations, and wherein the at least two radio base stations are not in communication with each other.

* * * * *